Oct. 26, 1965     R. W. HARMON     3,214,510
CORONA REDUCTION IN CONDUCTOR CLAMPS FOR HIGH
VOLTAGE TRANSMISSION LINES
Filed April 1, 1963

INVENTOR

ROBERT W. HARMON

BY *Kenneth W. Miller*

ATTORNEY

United States Patent Office 3,214,510
Patented Oct. 26, 1965

3,214,510
CORONA REDUCTION IN CONDUCTOR CLAMPS FOR HIGH VOLTAGE TRANSMISSION LINES
Robert W. Harmon, Doylestown, Ohio, assignor to The Ohio Brass Company, Mansfield, Ohio, a corporation of New Jersey
Filed Apr. 1, 1963, Ser. No. 269,656
11 Claims. (Cl. 174—144)

This application is a continuation-in-part of application Serial No. 266,469, filed March 18, 1963, by Robert W. Harmon.

This invention relates to high voltage transmission lines and, more particularly, to clamps for transmission line conductors.

The principal object of the invention is to increase the operating voltage of the transmission lines.

Another object of the invention is to reduce corona effects in clamps for transmission line conductors.

In United States Patent 3,076,863, issued February 5, 1963, to R. W. Harmon and A. D. Lantz, there is shown and described a bundle conductor system for power transmission lines particularly useful for transmission at very high voltages. As set forth in that patent, a plurality of conductor cables are carried from a string of suspension insulators by means of a suspension plate which holds the conductor cables in transversely spaced relation. The conductor cables are so carried with respect to the suspension insulators that corona effects are minimized and the line voltage is divided uniformly between the several insulators.

In connection with development and testing of the invention of the above referenced patent, it was discovered that the corona characteristics of suspension clamps of then known design constituted a limiting factor in the operation of the line. The inherent voltage capability of the bundle conductor and suspension plate greatly exceeded that of the suspension clamp so that a corona discharge would be initiated about the suspension clamp at voltages much lower than voltages required to initiate corona discharge about the remaining parts. Suspension clamps disclosed in my co-pending application, Serial No. 266,469, filed March 18, 1963, provide improved results in this respect, whereas the clamps shown and described herein embody new designs which have a corona limit substantially above that of suspension clamps heretofore utilized in the industry.

The invention, together with further objects, features and advantages thereof, will be apparent from the following detailed specification and claims, taken in connection with the appended drawings, in which:

Figure 2:
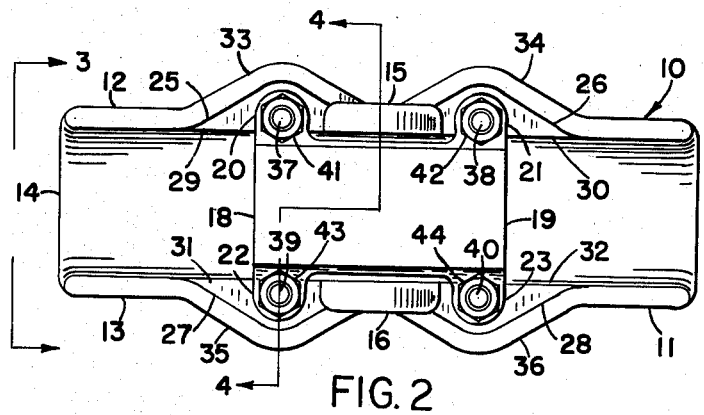
FIG. 2 is a top plan view of the conductor clamp of FIG. 1.

Referring now to the drawing, the clamp 10 of the invention is constituted by a unitary clamp body 11 having two side walls 12 and 13, a bottom wall 14, and two clevis arms 15 and 16. The side walls 12 and 13 have spaced interior portions and the bottom wall has an arcuate interior surface 17 to constitute a seat for a conductor cable extending longitudinally through the clamp.

A keeper 18 is constituted as a unitary elongate clamp piece 19 having laterally extending side pieces 20, 21, 22 and 23 for securing the keeper to the body 11. The clamp piece 19 has the interior portion thereof formed with an arcuate surface 24 to constitute a seat for engaging the cable conductor.

The clamp body 11 is constituted with recesses 25, 26, 27 and 28, also referred to herein as side wall recesses, in the laterally disposed portions of the side walls 12 and 13 in opposite longitudinal directions from the two clevis arms 15 and 16. As will be evident, particularly from FIG. 2 and FIG. 4, the recesses 25 to 28 are constituted by horizontally extending portions 29, 30, 31 and 32 of the side walls 12 and 13 and shield parts 33, 34, 35 and 36 of the clamp body extending laterally outward from the aligned parts of the walls of the body. The side pieces 20 to 23 of the keeper 18 are received in the recesses 25 to 28, and the shield parts 33 to 36 extend about and enclose the recesses 25 to 28 in the longitudinal and vertical directions of the clamp body. The shield parts 33 to 36 of the clamp body shield the side pieces 20 to 23 of the keeper, the extremities of the bolt fasteners 37, 38, 39 and 40, and the screw means or nuts 41, 42, 43 and 44 against excessive stress concentrations and minimize corona formation.

Figure 1:
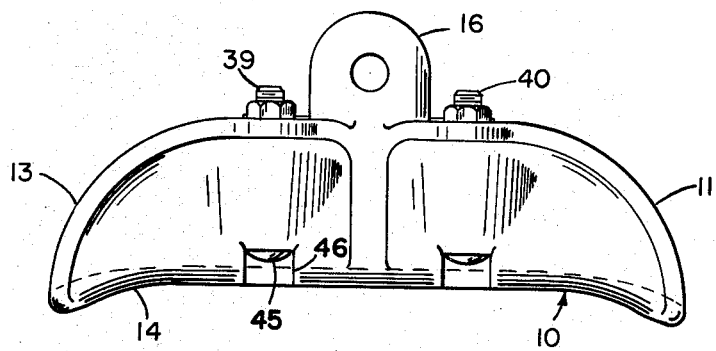
FIG. 1 is a side elevation view of a suspension clamp embodying the invention.
Figures 3, 4:
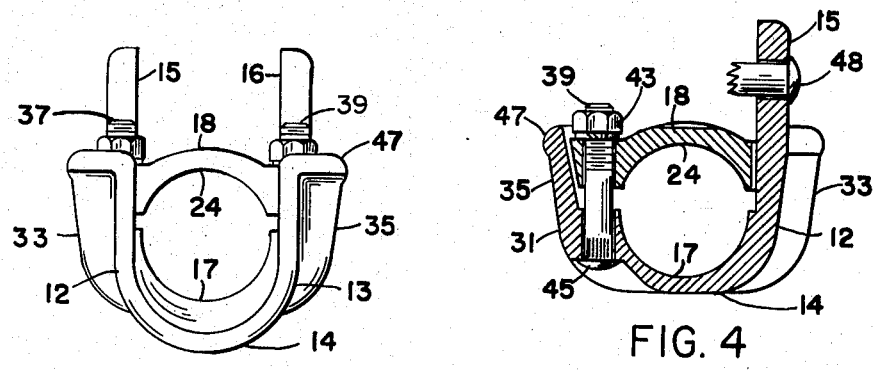
FIG. 3 is an end view of the conductor clamp of FIG. 1.
FIG. 4 is a section view of the clamp of FIG. 1 taken in the direction 4—4 in FIG. 2.

The bolt fasteners 37 to 40 are received through openings in the horizontally extending portions 29 to 32 of the side walls, illustrated for the portion 31 of the side wall 13 in FIG. 4. The heads of the bolts are received in recesses formed on the under side of the outwardly extending portions of the shield parts 33 to 36 and the side walls 12 and 13 and bottom wall 14. As illustrated in FIG. 1 and FIG. 4 for the bolt 39, the head 45 of the bolt 39 is disposed within the recess 46, also referred to herein as an exterior recess, defined by the shield part 35 and the adjacent portions of the side wall 13 and bottom wall 14 of the clamp body.

The top extremities of the side walls 12 and 13 and the shield parts 33 to 36 of the clamp body are formed with smoothly rounded surfaces, indicated at 47 for the shield part 35, to minimize corona formation and augment the shielding effect generally.

The clevis arms 15 and 16 are integral with the clamp body and have the surfaces thereof formed as smooth continuations of the surfaces of the side walls 12 and 13 of the clamp body and are positioned between the associated shield parts 33 and 34 and 35 and 36. The outwardly extending portions of the shield parts function to minimize electric stresses along the edges of the clevis arms 15 and 16 and the associated hardware, e.g., the pin 48. The corners and surfaces of the clevis arms and the merging portions of the arms and body and shielding parts are made as smooth as possible.

The bolt fasteners 37 to 40 are made with splined ends to provide an interference fit in the opening in the side wall for fixing the bolt in the wall. This arrangement permits the use of a smooth round bolt head to improve corona performance while facilitating assembly of the parts for hot line working and the like.

Conductor clamps constructed in accordance with the invention have functioned without visible corona or detectable radio noise at voltages from in excess of 520 kv. for single conductor assemblies to 1125 kv. for four-conductor assemblies, under test conditions. It will be understood that voltages specified are line to line voltage equivalents of line to ground test voltages and that the actual maximum operating voltage possible without substantial corona or radio noise is limited by the characteristics of the associated conductor assembly.

It is to be understood that the foregoing description is not intended to restrict the scope of the invention and that various rearrangements of the parts and modifications of the design may be resorted to. The following

I claim:

1. A conductor clamp comprising an elongate unitary clamp body having a longitudinal cable-receiving groove defined by a bottom wall and spaced side walls, means on the side walls at the central part of the body for carrying the clamp from an associated structural part, recesses in the top portions of the side walls, a keeper received in the cable groove and comprising an elongate member having laterally extending side pieces received in the recesses, and means securing the keeper to the side walls of the body comprising a plurality of bolt fasteners, each extending vertically through one of the side pieces and into the wall of the clamp body, and conductive means on the exterior of the side walls extending outwardly from the side walls and about the recesses and electrically shielding the extremities of the side pieces and the associated extremities of the fasteners, the side walls, first named means and said conductive means having smoothly merging adjacent surface portions for corona free electrification of the clamp at voltages to at least 520 kv.

2. A conductor clamp comprising an elongate unitary clamp body having a longitudinal cable-receiving groove constituted by a bottom wall and spaced side walls, recesses in each of the side walls spaced in the longitudinal direction of the clamp body and each recess extending transversely of the wall from the interior thereof a keeper in the cable receiving groove comprising an elongate member having the interior surface thereof opposed to a cable seat on the interior surface of the bottom wall of the clamp body and two pairs of side pieces extending transversely from the keeper and into the recesses, means securing the keeper to the side walls of the clamp body comprising a plurality of bolt fasteners, each extending vertically through one of the side pieces and into the side wall of the clamp body, and means electrically shielding the extremities of each of the several side pieces and the associated extremities of the fasteners, each shielding means comprising a metal shield part extending outwardly from the side wall in the transverse direction and about a recess in the side wall in the longitudinal direction of the clamp body, the said metal shield part merging smoothly with the clamp body in each longitudinal direction from and below the side wall recess.

3. A conductor clamp in accordance with claim 2, in which the metal shield parts are integral with the body of the clamp.

4. A conductor clamp in accordance with claim 3, in which there is an exterior recess in the clamp body below each of the side wall recesses, an opening through the portion of the wall between the said recesses, the fastener has an extremity thereof received in the exterior recess, and the portions of the clamp body adjacent to the exterior recess extend outwardly from the extremity of the bolt therein and are substantially smooth in the longitudinal and circumferential directions of the clamp body for electrically shielding the said extremity of the bolt.

5. A conductor clamp in accordance with claim 4, with screw means threaded on each of the bolts and bearing upon the exterior surface of the side piece associated therewith the screw means and the extremity of the bolt being shielded by the metal shield part associated therewith.

6. A conductor clamp in accordance with claim 4, in which the exterior recesses are defined by an adjacent portion of the metal shield part above the recess.

7. A suspension clamp in accordance with claim 6, with clevis arms extending from the side walls in the vertical direction away from the bottom wall of the clamp body between the shield parts, the said clevis arms being adapted for connection with associated suspension apparatus, the shield parts extending laterally outward beyond the clevis arms and electrically shielding the said arms and suspension apparatus.

8. In a conductor clamp in which there is an elongate unitary clamp body, a longitudinal cable-receiving groove constituted by a bottom wall and spaced side walls of the said body, recesses in each of the side walls of the clamp body spaced in the longitudinal direction of the body and each recess extending transversely of the wall from the interior thereof, a keeper in the cable groove comprising an elongate member having the interior surface thereof opposed to a cable seat on the interior surface of the bottom wall of the clamp body and side pieces on the member extending transversely outward from the member and into the side wall recesses, and means securing the keeper to the side walls of the clamp in the side wall recesses comprising bolt fasteners extending vertically through the side pieces and the side walls of the clamp body, that improvement which comprises electrical shield means for each of the side pieces, each shield means comprising a metal shield part integral with the side wall of the clamp body and extending outwardly from and about a side wall recess in each longitudinal direction and to the side wall below the side wall recess.

9. In a conductor clamp in which there is an elongate unitary clamp body, a longitudinal cable-receiving groove constituted by a bottom wall and spaced side walls of the said body, recesses in each of the side walls of the clamp body spaced in the longitudinal direction of the body and each recess extending transversely of the wall from the interior thereof, a keeper in the cable groove comprising an elongated member having the interior surface thereof opposed to a cable seat on the interior surface of the bottom wall of the clamp body and side pieces on the member extending transversely outward from the member and into the side wall recesses, and means securing the keeper to the side walls of the clamp in the side wall recesses comprising bolt fasteners extending vertically through the side pieces and the side walls of the clamp body, that improvement which comprises electrical shield means for each of the side pieces, each shield means comprising a metal shield part integral with the side wall of the clamp body and extending outwardly from and about a side wall recess in each longitudinal direction and to the side wall below the side wall recess, and means integral with the walls defining an exterior recess for each fastener below each shield part with the lower extremity of the fastener therein, the exterior surface of the said means extending smoothly in both circumferential and longitudinal directions of the clamp body from and across the said recess and electrically shielding the lower extremity of the fastener, all for corona-free electrification of the clamp at voltages to at least 500 kv.

10. A conductor clamp in accordance with claim 9, in which the metal shield part extends downward to the exterior recess and comprises one part of the said means electrically shielding the lower extremity of the fastener.

11. A conductor clamp in accordance with claim 9, in which the lower extremity of the fastener is disposed in the exterior recess wholly within the outward extremity thereof defined by smoothly continuing the adjacent surface portions of the clamp body across the recess.

References Cited by the Examiner

UNITED STATES PATENTS

| | | | |
|---|---|---|---|
| 1,966,258 | 7/34 | McCoy | 248—63 |
| 1,997,627 | 4/35 | Casey. | |
| 2,699,462 | 1/55 | Exner | 174—73 X |

OTHER REFERENCES

German printed application, 1,061,404, July 16, 1959.

LARAMIE E. ASKIN, *Primary Examiner.*

JOHN P. WILDMAN, *Examiner.*